United States Patent
Tanoi et al.

(10) Patent No.: US 7,661,960 B2
(45) Date of Patent: Feb. 16, 2010

(54) ELECTRICAL CONTACT MECHANISM

(75) Inventors: Tsutomu Tanoi, Toyoake (JP); Yusuke Kokubo, Aichi-ken (JP)

(73) Assignee: Aisin Seiki Kabuhsiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 12/292,199

(22) Filed: Nov. 13, 2008

(65) Prior Publication Data
US 2009/0127885 A1    May 21, 2009

(30) Foreign Application Priority Data
Nov. 19, 2007   (JP)   ............................. 2007-299282

(51) Int. Cl.
*H01R 39/00*    (2006.01)
(52) U.S. Cl. ........................................................ 439/31
(58) Field of Classification Search ................... 439/31, 439/34, 21, 22, 165
See application file for complete search history.

(56) References Cited

U.S. PATENT DOCUMENTS

| | | | | |
|---|---|---|---|---|
| 2,753,531 | A * | 7/1956 | Butler | 333/261 |
| 3,355,695 | A * | 11/1967 | Overesch | 439/31 |
| 3,601,598 | A * | 8/1971 | Horn | 362/418 |
| 3,857,625 | A * | 12/1974 | Crane et al. | 439/31 |
| 4,450,495 | A * | 5/1984 | Naruki | 360/137 |
| 5,013,252 | A * | 5/1991 | Nienhuis et al. | 439/215 |
| 5,027,394 | A * | 6/1991 | Ono et al. | 379/434 |
| 5,363,089 | A * | 11/1994 | Goldenberg | 340/7.63 |
| 5,796,331 | A * | 8/1998 | Lamparter | 340/433 |
| 6,292,563 | B1 * | 9/2001 | Clark et al. | 379/433.13 |
| 7,001,193 | B2 * | 2/2006 | Zaderej et al. | 439/165 |
| 7,058,194 | B2 * | 6/2006 | Jeon et al. | 381/367 |
| 7,117,565 | B2 * | 10/2006 | Brutsaert | 16/386 |
| 7,172,428 | B2 * | 2/2007 | Huang | 439/11 |
| 7,195,494 | B2 * | 3/2007 | Ookura | 439/74 |
| 7,266,963 | B2 * | 9/2007 | Lee | 62/259.1 |
| 7,278,184 | B2 * | 10/2007 | Kuramochi | 16/357 |
| 7,311,525 | B2 * | 12/2007 | Koiwaya | 439/31 |
| 7,322,209 | B2 * | 1/2008 | Hwang et al. | 62/449 |
| 7,438,573 | B2 * | 10/2008 | Jao et al. | 439/165 |
| 7,497,697 | B2 * | 3/2009 | Hoshino et al. | 439/74 |

FOREIGN PATENT DOCUMENTS

JP    10-24782    1/1998

* cited by examiner

*Primary Examiner*—T C Patel
*Assistant Examiner*—Vladimir Imas
(74) *Attorney, Agent, or Firm*—Finnegan, Henderson, Farabow, Garrett & Dunner, LLP

(57) ABSTRACT

An electrical contact mechanism adapted to be mounted to a retractable mechanism including a supporting mechanism for extending a roof and a rear window and stowing the roof and the rear window in a stowage space, includes a first member rotating in conjunction with the supporting mechanism, a first contact mounted to the first member, a second member connected to the first member and rotating relative to the first member in conjunction with the supporting mechanism, and a second contact mounted to the second member, wherein electric power is supplied to an apparatus mounted to at least one of the roof and the rear window by connecting the first contact with the second contact.

9 Claims, 6 Drawing Sheets

US 7,661,960 B2

ELECTRICAL CONTACT MECHANISM

CROSS REFERENCE TO RELATED APPLICATIONS

This application is based on and claims priority under 35 U.S.C §119 with respect to Japanese Patent Application 2007-299282, filed on Nov. 19, 2007, the entire content of which is incorporated herein by reference.

FIELD OF THE INVENTION

The invention relates to an electrical contact mechanism used for a vehicle, in particular relates to an electrical contact mechanism supplying electric power to apparatuses mounted to a roof which may be stowed or extended.

BACKGROUND

Various electrical apparatuses are mounted to an existing rear door and the like which opens and closes a vehicle. In such a door system, electric power is transmitted from a vehicle body side to a rear door through wire harnesses to be supplied to electrical apparatuses such as an electrical lock apparatus, a defogger mounted to a window for removing frost, and a high mount stop lamp (For example, refer to JP H10-24782A).

Recently, convertibles, having a so-called retractable mechanism by which a roof and a rear window are folded and stowed in a luggage room located at a rear of the vehicle, become widely used. In such a vehicle, similarly to the rear door disclosed in JP H10-24782A, when supplying electric power to electrical apparatuses mounted to the roof and the rear window, the electric power is supplied from the vehicle body side through wire harnesses.

However, in a case of the convertible having the retractable mechanism, when extending and stowing the roof and the rear window, the roof and the rear window rotate at a larger angle and move a longer distance relative to the vehicle body, compared to the rear door disclosed in JP H10-24782A. Thus, harnesses used for the convertible should be formed so as to prevent wire breakage due to repeated forcible bending. Specifically, the harnesses need to be formed so as to have a longer loose portion, which freely bends without being fixed between the vehicle body and the rear window. Further, the harnesses need to be formed so as to bend significantly when the roof and the rear window are folded. When the roof and the rear window are stowed, the loose portions of each harness, being able to freely bend, occupy an extra space in the luggage room, thus impairing convenience.

A need exists for a contact mechanism which is not susceptible to the drawback mentioned above.

SUMMARY OF THE INVENTION

According to an aspect of the present invention, an electrical contact mechanism adapted to be mounted to a retractable mechanism including a supporting mechanism for extending a roof and a rear window of a vehicle to a position that an upper portion of a vehicle compartment is fully covered thereby and stowing the roof and the rear window in a stowage space provided at a vehicle body, includes a first member rotating in conjunction with operation of the supporting mechanism, a first contact mounted to the first member, a second member connected to the first member and rotating relative to the first member in conjunction with the operation of the supporting mechanism, and a second contact mounted to the second member, wherein electric power is supplied to an electrical apparatus mounted to at least one of the roof and the rear window by connecting the first contact with the second contact.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the invention will be described in details with reference to drawings.

Figure 1:
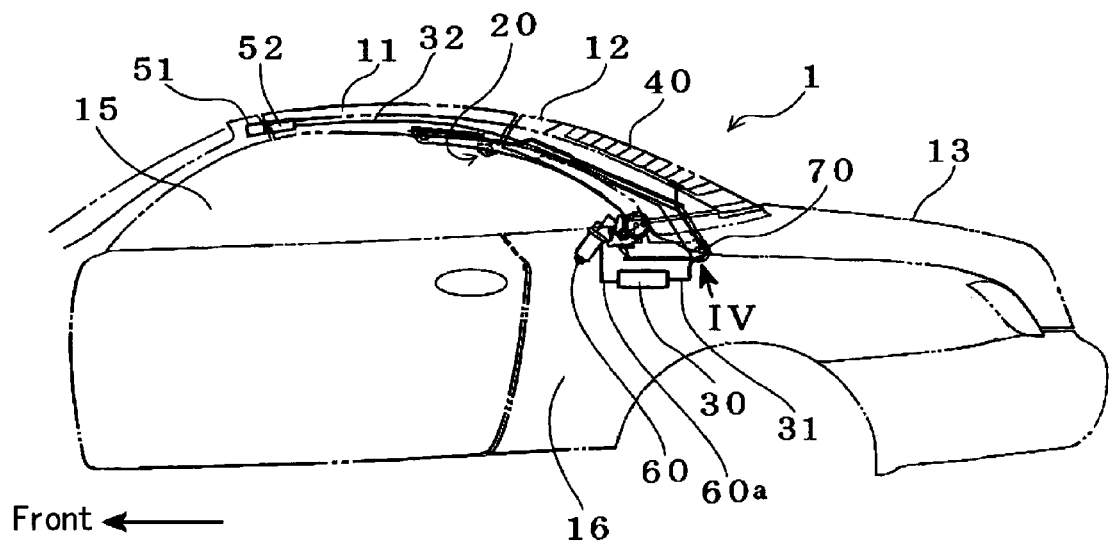
FIG. 1 is a side view of a vehicle including a contact mechanism according to an embodiment of the invention, showing a state that a roof and a rear window are extended.
Figure 2:
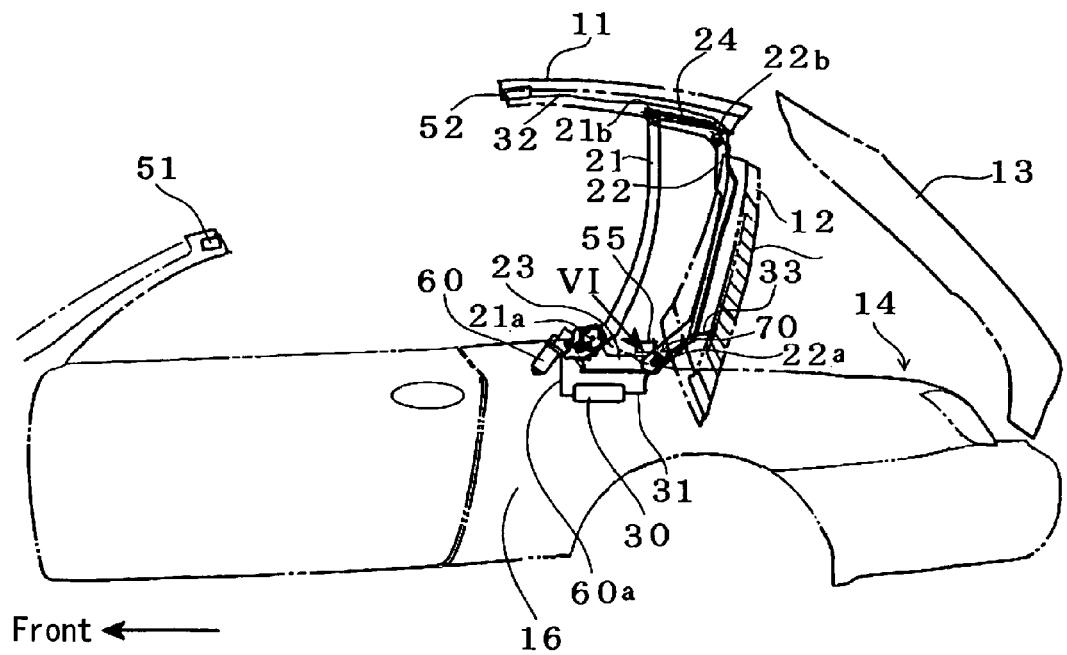
FIG. 2 is a side view of the vehicle including the contact mechanism according to the embodiment of the invention, showing a state that the roof and the rear window are retracted to a rear of the vehicle.
Figure 3:
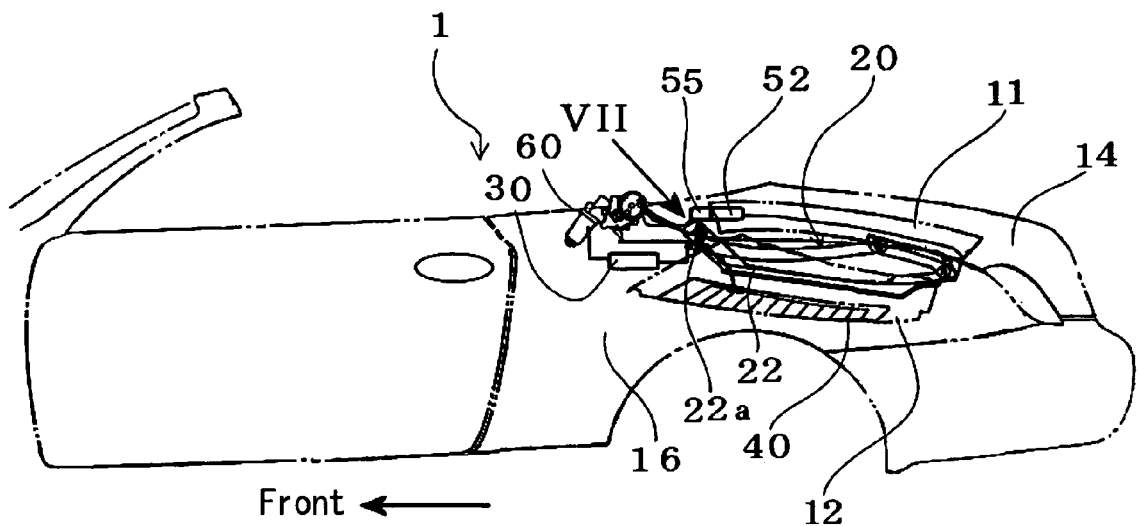
FIG. 3 is a side view of the vehicle including the contact mechanism according to the embodiment of the invention, showing a state that the roof and the rear window are stowed in a luggage room.

FIG. 1 is a side view of a vehicle 1 including a retractable mechanism by which a roof 11 and a rear window 12 are folded and stowed in a luggage room 14 located at a rear of the vehicle 1. An arrow in FIG. 1 indicates a forward direction of the vehicle 1. The roof 11 and the rear window 12 are supported by a supporting mechanism 20 mounted to a vehicle body 16. In FIG. 1, the roof 11 and the rear window 12 are extended to a position that an upper portion of a vehicle compartment 15 is fully covered thereby. FIGS. 2 and 3, which will be described below, depict a stowage process of the roof 11 and the rear window 12. In the process, the supporting mechanism 20 is operated, and the roof 11 and the rear window 12 are retracted from an extended position shown in FIG. 1 to the luggage room 14 (stowage space) provided at a rear of the vehicle body 16 after going through a state shown in FIG. 2. Then, the roof 11 and the rear window 12 are stowed as shown in FIG. 3.

Figure 8:
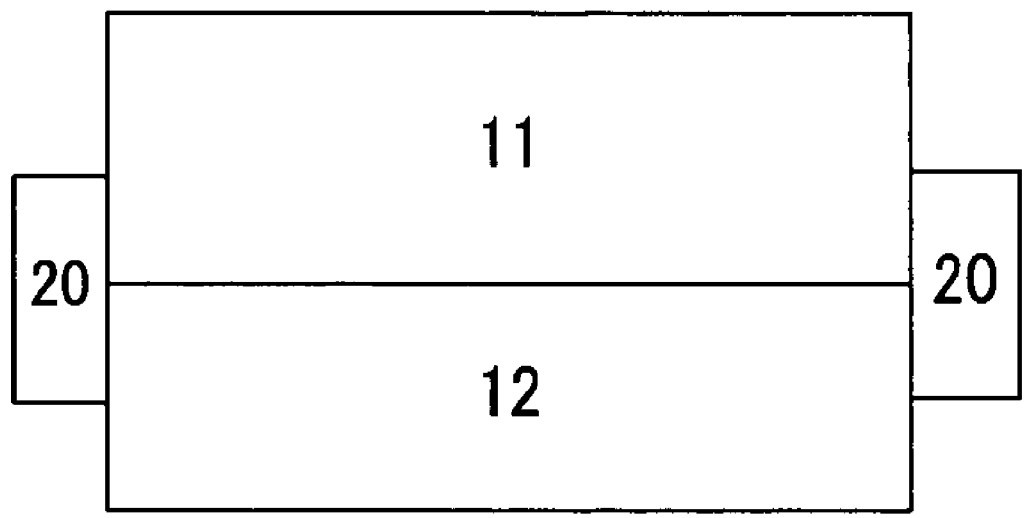
FIG. 8 is a schematic view showing a relationship among a pair of supporting mechanisms, the roof, and the rear window.
Figure 9:
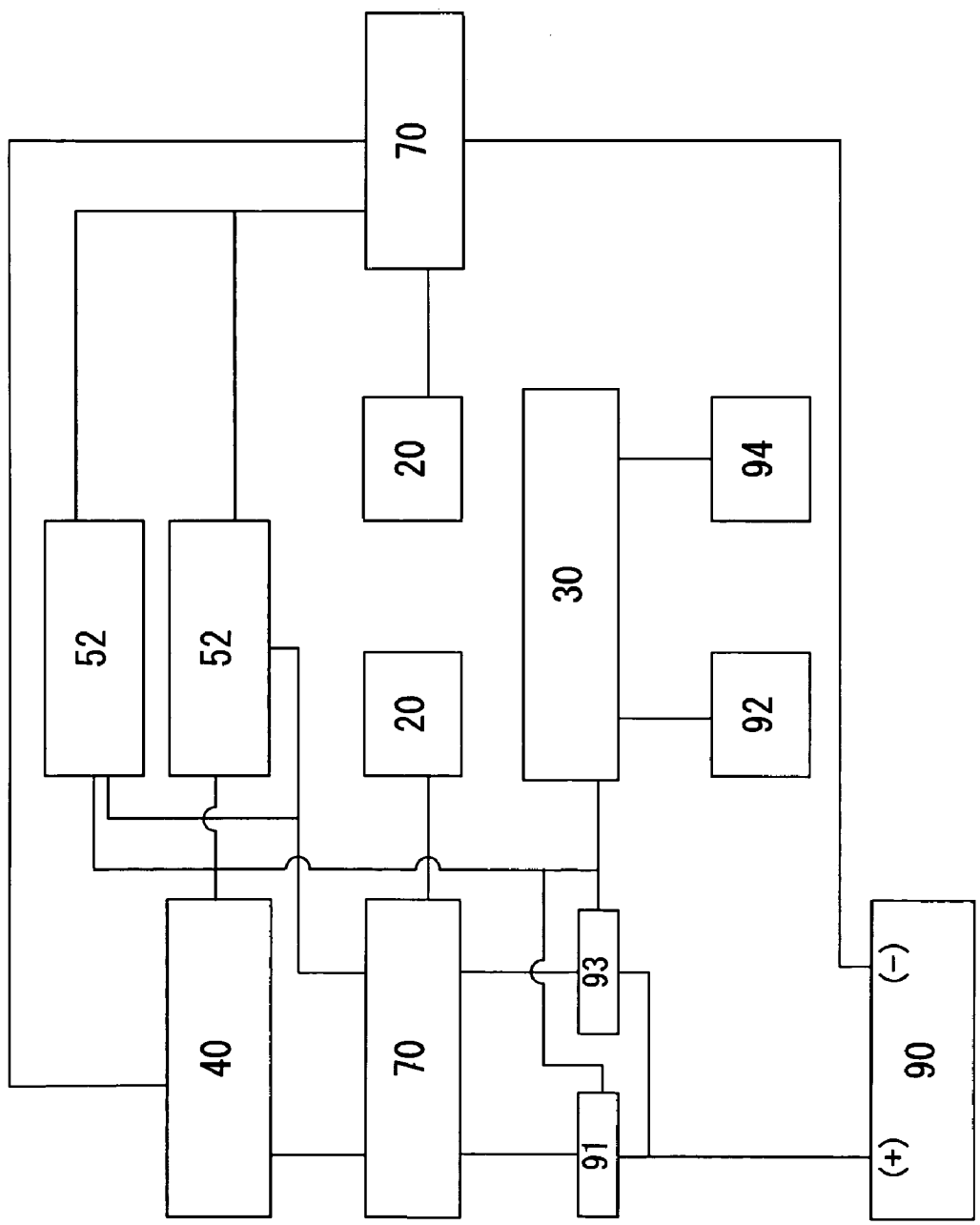
FIG. 9 is a block diagram showing an electrical system in which the contact mechanism is located.

FIGS. 1, 2, and 3 are side views, viewed from a left side of the vehicle. Hereinafter, unless otherwise stated, the vehicle 1 according to the embodiment will be symmetrically constructed. As schematically shown in FIG. 8, the supporting mechanisms 20 are respectively provided at left and right sides of the vehicle to form a pair and support the roof 11 and the rear window 12 at each left and right end portion.

FIG. 2 shows a process in which the roof 11 and the rear window 12 are retracted to the rear of the vehicle 1. The configuration of the supporting mechanism 20 will be described with reference to FIG. 2. The supporting mechanism 20 includes a base 23 which extends in a longitudinal direction of the vehicle 1 and is fixed to the vehicle body 16. A pair of a front link 21 and a rear link 22, extending upward, is connected with the base 23 so as to rotate in the longitudinal direction. Specifically, the front link 21 is connected with a front end portion of the base 23 by a rotating shaft 21*a*, and the rear link 22 is connected with a rear end portion of the base 23 by a rotating shaft 22*a*. Further, a front end portion of a supporting bracket 24 is connected with an upper end of the front link 21 by a rotating shaft 21*b*, and a rear end portion of the supporting bracket 24 is connected with an upper end of the rear link 22 by a rotating shaft 22*b*. The base 23, the front link 21, the rear link 22 and the supporting bracket 24 are connected with each other by the rotating shafts 21*a*, 21*b*, 22*a* and 22*b* to form a so called four-link mechanism which moves the supporting bracket 24 retaining a predetermined posture.

The roof 11 is fixedly mounted to the supporting bracket 24, and the rear window 12 is fixedly mounted to the rear link 22. A driving device 60 is mounted to the base 23 for driving the supporting mechanism 20. A luggage door driving apparatus (not shown) drives a luggage door 13 of the luggage room 14 to open in conjunction with rearward movement of the roof 11 and the rear window 12.

FIG. 3 shows a state in which the roof 11 and the rear window 12 are further retracted from a position shown in FIG. 2 and are stowed in the luggage room 14. In the process shown in FIGS. 1 to 3, the roof 11 and the rear window 12 follow a predetermined track being supported by the supporting mechanism 20. Then, the rear window 12 rotates approximately 180 degrees around the rotating shaft 22*a* relative to the vehicle body 16, and the roof 11 rotates approximately 180 degrees around the rotating shaft 22*b* relative to the rear window 12.

An electrical lock 52 (electrical apparatus), having a built-in electric driving device (not shown), is mounted on a tip end portion of the roof 11 in order to secure the extended position of the roof 11 as shown in FIG. 1, and a lock catch 51 is mounted to an upper end of a frame of a vehicle windshield. Further, as shown in FIG. 3, a lock catch 55 is mounted in the luggage room 14 being fixed to the vehicle body 16. The lock catch 55 engages with the lock 52, thereby retaining a position that the roof 11 is stowed. The lock 52 automatically engages with the lock catch 51 or the lock catch 55 in predetermined positions. A control unit 30 opens a switch 91 to release the engagement.

Further, a defogger 40 (electrical apparatus), removing water drops on the window by heating for securing the driver's visibility, is mounted to the rear window 12. A harness 33 is connected with the defogger 40 for electric power supply, and a harness 32 is connected with the lock 52 to supply electric power for the engagement with the lock catch 51 or the lock catch 55. Each harness 32 and 33 is connected with a contact mechanism 70 (electrical contact mechanism) mounted to the rotating shaft 22*a* of the supporting mechanism 20. Furthermore, the contact mechanism 70 is connected with the control unit 30 mounted to the vehicle body 16 through a harness 31. A battery 90 is wired to electrical apparatuses such as the lock 52 and the defogger 40 and the contact mechanism 70, and the wiring enables electric power supply to the electrical apparatuses through the contact mechanism 70.

The driving device 60 driving the supporting mechanism 20 is connected with the control unit 30 through a harness 60*a*. The control unit 30 controls the supporting mechanism 20 in a predetermined operating method as well as the defogger 40, the lock 52, and a luggage door driving device (not shown).

Figure 4:
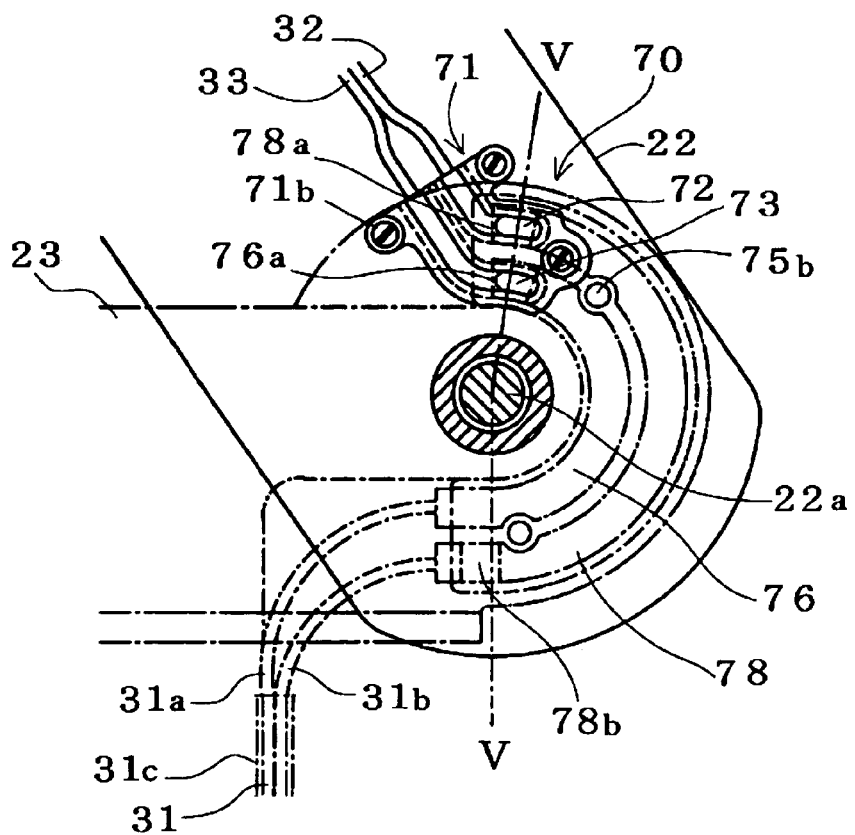
FIG. 4 is an enlarged view of a portion IV in FIG. 1.
Figure 5:
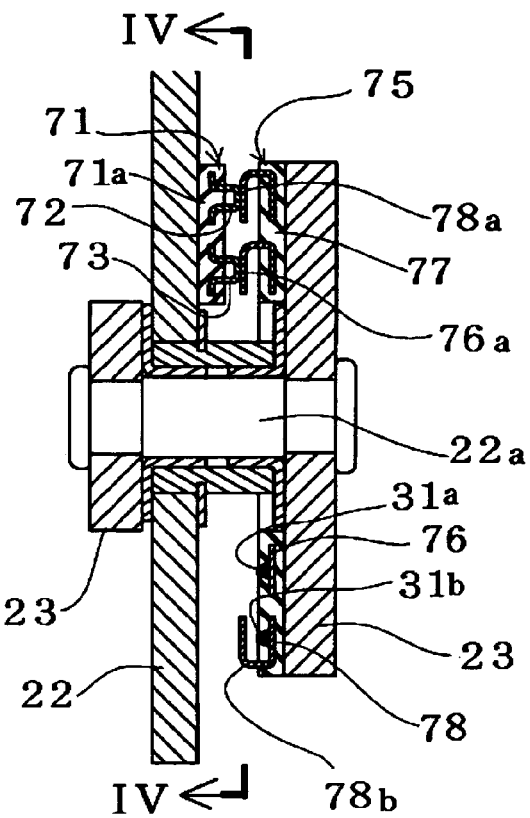
FIG. 5 is a sectional view taken along a line V-V in FIG. 4.

FIG. 4 is an enlarged view of a portion IV shown in FIG. 1, showing the contact mechanism 70 in detail. FIG. 5 is a sectional view taken along a line V-V in FIG. 4. As shown in FIGS. 4 and 5, the rear link 22 is rotatably supported around the rotating shaft 22*a*, which is fixedly mounted to the base 23, through a bearing member.

The contact mechanism 70 includes a movable contact portion 71 (first member) fixed to the rear link 22 and a fixed contact portion 75 (second member) fixed to the base 23. The movable contact portion 71 includes a substrate 71*a* formed by an insulating material. The substrate 71*a* is fixedly mounted to the rear link 22 with screws 71*b* in a position spaced a predetermined distance away from the rotating shaft 22*a*. A contact 73 (first contact) and a contact 72 (first contact) are mounted to the substrate 71*a*. The contact 73 connects with the harness 33 for the defogger 40, and the contact 72 connects with the harness 32 for the lock 52. Parts of each contact 72 and 73 project from the substrate 71*a*, and the other portions of each contact 72 and 73 are fixedly embedded in the substrate 71*a*.

The fixed contact portion 75 includes a substrate 77 formed by an insulting material. The substrate 77 is formed in an arch shape around the rotating shaft 22*a* being spaced a predetermined radial distance away therefrom. The substrate 77 is fixedly mounted to the base 23 by multiple screws 75*b*. Energization plates 76 and 78 are embedded in the substrate 77.

Harnesses 31*a* and 31*b* are bundled by a coating material 31*c* to comprise the harness 31 which connects the control unit 30 with the contact mechanism 70. The harness 31*a* connects with the energization plate 76, and the harness 31*b* connects with the energization plate 78. A contact 76*a* (second contact) is formed at an upper end portion of the energization plate 76 so as to project from the substrate 77, and a contact 78*a* (second contact) is formed at an upper end portion of the energization plate 78 so as to project from the substrate 77. At lower end portions of the energization plates 76 and 78, a contact 78*b*, having a similar form to the contact 78*a*, is formed only at the lower end portion of the energization plate 78.

When the roof 11 and the rear window 12 are extended to fully cover the upper portion of the vehicle compartment 15 as shown in FIG. 1, the contact 72 is in contact with the contact 78*a*, and the contact 73 is in contact with the contact 76*a* as shown in FIGS. 4 and 5. In the state, electric power may be supplied to the lock 52 and the defogger 40 by the control unit 30.

When an occupant operates a retractable switch 92 for stowing the roof 11 and the rear window 12, the control unit 30 opens the switch 91 for releasing the engagement between the lock 52 and the lock catch 51. Similarly, when the occupant operates a defogger switch 94, the control unit 30 closes the switch 93 to supply electric power to the defogger 40.

Figure 6:
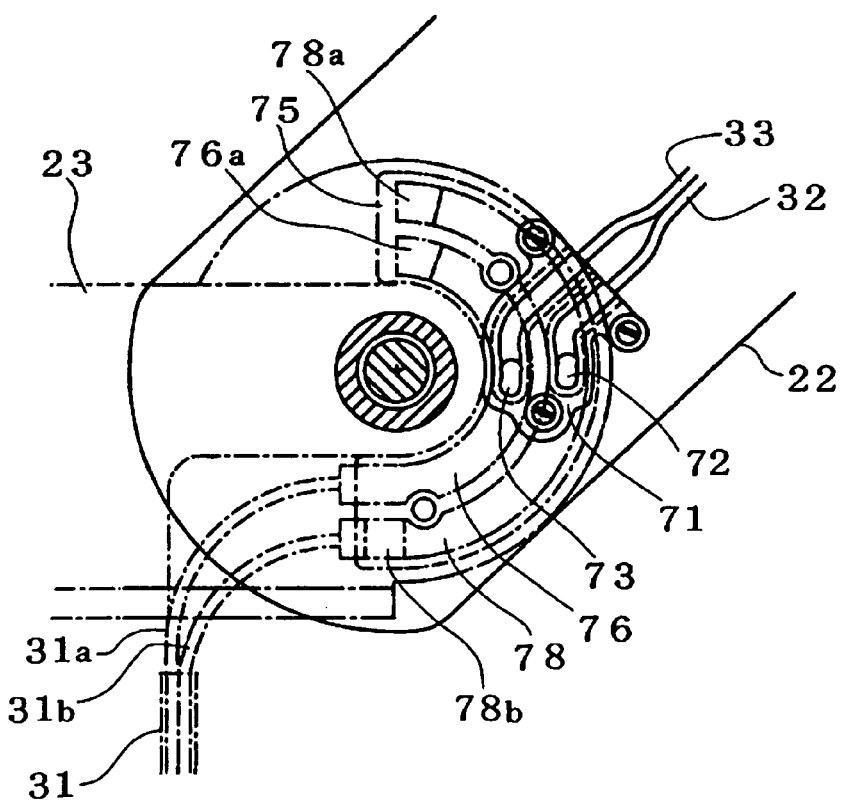
FIG. 6 is an enlarged view of a portion VI in FIG. 2.
Figure 7:
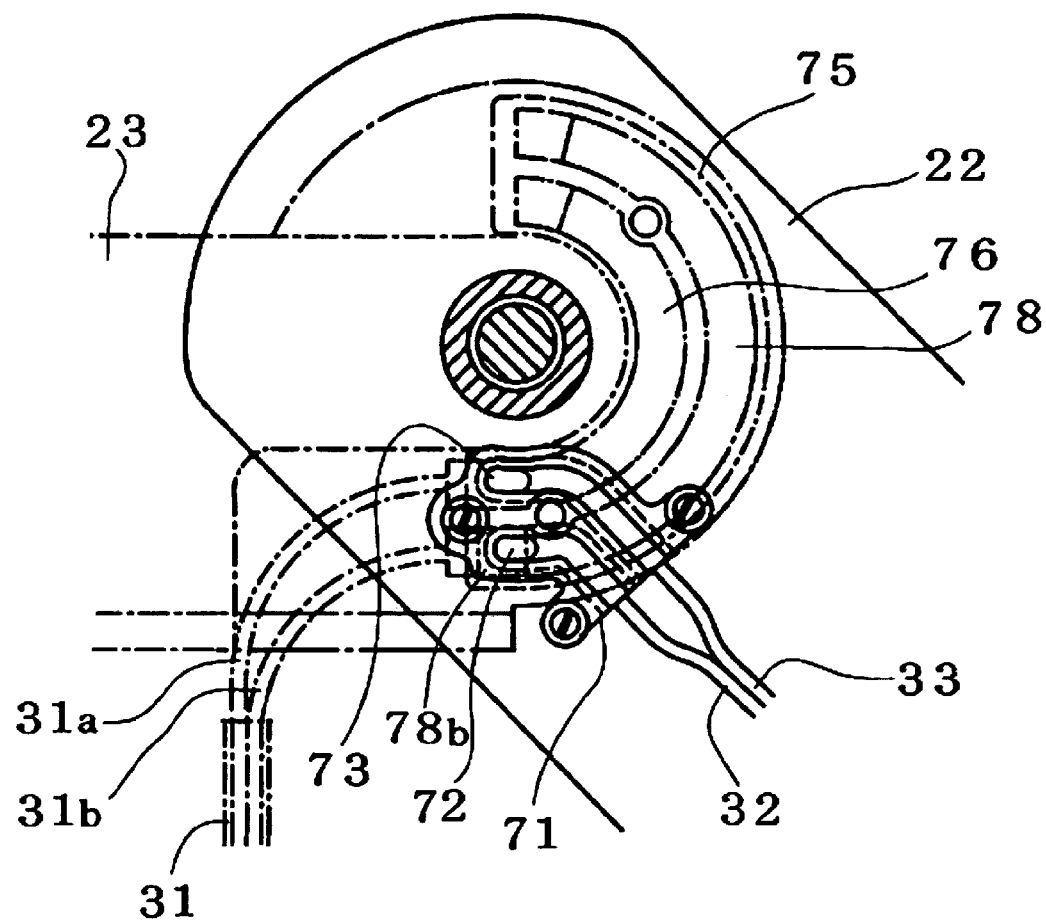
FIG. 7 is an enlarged view of a portion VII in FIG. 3.

FIG. 6 is an enlarged view of a portion VI shown in FIG. 2, showing the contact mechanism 70 in detail. FIG. 7 is an enlarged view of a portion VII shown in FIG. 3, showing the contact mechanism 70 in detail.

The projecting portions of the contacts 76*a* and 78*a* form short lengths. If the rear link 22 slightly rotates rearward from a position shown in FIG. 4, the contact 72 and the contact 78*a* are separated, and the contact 73 and the contact 76*b* are separated. Further, when the rear link 22 reaches a position shown in FIG. 7, the contact 72 comes in contact with the contact 78*b*. In this state, the lock 52 engages with the lock catch 55.

When moving the roof 11 and the rear window 12 back to the extended position shown in FIG. 1 from a state that the roof 11 and the rear window 12 are stowed as shown in FIG. 3, the above-described process is reversed. Namely, the occupant operates the retractable switch 92, thereby opening the switch 91 to release the engagement between the lock 52 and the lock catch 55. Then, the luggage door 13 opens, and the roof 11 and the rear window 12 are controlled to return to the extended position.

Electric power is transmitted from a positive electrode of the battery 90, serving as an electric power unit provided at the vehicle 1, to be supplied to the lock 52 and the defogger 40 through the contact mechanism 70. Another contact mechanism 70, which is similar to the above-described contact mechanism 70, is mounted to a supporting mechanism 20 at a right side of the vehicle as a part of a circuit connected with a negative electrode of the battery 90. At a negative electrode side, a common wiring may be shared between the lock 52 and the defogger 40. Thus, the configuration becomes simpler than that of the contact mechanism 70 connecting with the positive electrode.

In the contact mechanism 70 configured as described above, when the rear window 12 is stowed in the luggage room 14, the power supply circuit, transmitting the electric power to the defogger 40, is ensured to be shut off mechanically, thus achieving a fail safe.

Further, unlike known vehicles, the contact mechanism 70 enables to make a connection between the vehicle body and the rear window without harnesses. Thus, the space of the luggage room 14 is not consumed by bending harnesses. Furthermore, in a case that harnesses are used for making the connection, consideration is required for the configuration and the allocation of the vehicle body so that harnesses do not hook into objects or mechanisms in the luggage room 14. The contact mechanism 70 enables a simpler design of the vehicle.

In the above-described embodiment, the lock 52 and the defogger 40 are mentioned as typical examples of the electrical apparatuses. However, even when the number of electrical apparatuses mounted to the roof 11 and the rear window 12 is increased, the vehicle is able to handle the increase by increasing the number of contacts in the contact mechanism 70. Particularly, in case that a large number of electrical apparatuses need to be mounted, if the harnesses are used for connection, the bundle of the harnesses becomes so thick that the bundle is not able to freely bend. Consequently, a limitation occurs on the number of mounted electrical apparatuses. In case of the contact mechanism 70, it is possible to increase the number of mounted electrical apparatuses.

In the configuration of the above-described embodiment, the roof 11 is connected with the rear window 12 through the harness 32 for supplying electric power to the lock 52. However, a contact mechanism may be used in a circuit between the roof 11 and the rear window 12. Further, in the above-described embodiment, the supporting mechanism 20 and the contact mechanism 70 share the common rotating shaft 22a to reduce the number of components. However, the supporting mechanism 20 and the contact mechanism 70 may have separate rotating shafts.

The control unit 30 operates so that electric power is supplied to the lock 52 and the defogger 40 after the contacts are connected with each other. Thus, occurrence of spark due to improper connection is prevented, and durability of contacts and safety are secured.

According to a first aspect of the present invention, the electrical contact mechanism 70 includes the movable contact portion 71 rotating in conjunction with operation of the supporting mechanism 20, which extends the roof 11 and the rear window 12 of the vehicle 1 to the position that the upper portion of the vehicle compartment 15 is fully covered thereby and stows the roof 11 and the rear window 12 in the luggage room 14 provided at the vehicle body 16, the contacts 72 and 73 mounted to the movable contact portion 71, the fixed contact portion 75, connected to the movable contact portion 71 and rotating relative to the movable contact portion 71 in conjunction with the operation of the supporting mechanism 20, and the contacts 76a and 78a mounted to the fixed contact portion 75. The electrical contact mechanism 70 allows the electric power to be supplied to the lock 52 and the defogger 40 mounted to at least one of the roof 11 and the rear window 12 by connecting the contacts 72 and 73 with the contacts 76a and 78a.

According to a second aspect of the present invention, wherein the contacts 72 and 73 are electrically connected with the second contacts 76a and 78a when the movable contact portion 71 and the fixed contact portion 75 form the predetermined angle therebetween.

According to a third aspect of the present invention, wherein the rotation axes of the movable contact portion 71 and the fixed contact portion 75 are coaxially arranged with the rotating shaft 22a of the supporting mechanism 20.

According to a fourth aspect of the present invention, wherein the movable contact portion 71 is fixedly mounted to the rear link 22 of the supporting mechanism 20, which supports the rear window 12, and the fixed contact portion 75 is fixedly mounted to the vehicle body 16, wherein the contacts 72 and 73 are connected with the defogger 40 mounted to the rear window 12, and the contacts 72 and 73 are electrically connected with the contacts 76a and 78a when the roof 11 and the rear window 12 are extended to the position that the upper portion of the vehicle compartment 15 is fully covered thereby.

According to the above-described embodiment, the movable contact portion 71 and the fixed contact portion 75 are connected so as to rotate relative to each other, and the contacts 72 and 73 and the contacts 76a and 78a are respectively provided at the movable contact portion 71 and the fixed contact portion 75. The electric contact mechanism 70 supplies the electric power by connecting the contacts 72 and 73 with the contacts 76a and 78a. The contact mechanism 70, which supplies the electric power, enables to make a connection between the vehicle body 16 and the rear window 12 without harnesses. Thus, when the roof 11 and the rear window 12 are stowed in the luggage room 14, the extra space is not consumed due to deformation of the harnesses. Therefore, convenience of the vehicle 1 is not impaired.

According to the above-described embodiment, the contacts 72 and 73 are electrically connected with the contacts 76a and 78a when the movable contact portion 71 and the fixed contact portion 75 form the predetermined angle therebetween. Thus, electric power is supplied to the lock 52 and the defogger 40 when the predetermined angle is formed between the movable contact portion 71 and the fixed contact portion 75.

According to the above-described embodiment, the rotation axes of the movable contact portion 71 and the fixed contact portion 75 are coaxially arranged with the rotating shaft 22a of the supporting mechanism 20, thereby configuring the contact mechanism 70 with fewer components.

According to the above-described embodiment, electric power is supplied to the defogger 40 only when the roof 11 and the rear window 12, to which the defogger 40 is mounted, are extended to the position that the upper portion of the vehicle compartment 15 is fully covered. Thus, even if any failure occurs in the control unit 30 for the defogger 40 when the roof 11 and the rear window 12 are stowed in the luggage room 14, the operation of the defogger 40 is not conducted and heat is not generated. Therefore, a fail-safe is achieved.

The principles, of the preferred embodiments and mode of operation of the present invention have been described in the foregoing specification. However, the invention, which is intended to be protected, is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. An electrical contact mechanism adapted to be mounted in an electrically operated supporting mechanism for selectively extending a roof and a rear window to fully cover an upper portion of a vehicle compartment and stowing the roof and the rear window in a stowage space provided at a rear portion of a vehicle body to fully open the upper portion of the vehicle compartment, the electrical contact mechanism comprising:
   a first member fixed to the electrically operated supporting mechanism, the first member being brought into rotation in conjunction with the supporting mechanism when the supporting mechanism operates in one direction to extend the roof and the rear window and in the other direction, to stow the roof and the rear window, respectively;
   a first contact provided on the first member;
   a second member fixed to the vehicle body; and
   a second contact provided on the second member,
   wherein when the first member rotates relative to the second member as a result of the operation of the supporting mechanism in said one direction, the first contact of the first member is brought into connection with the second contact, resulting in electric power supply to an electrical apparatus mounted to at least one of the roof and the rear window.

2. An electrical contact mechanism according to claim 1, wherein the first contact is electrically connected with the second contact when the first member and the second member form a predetermined angle therebetween.

3. An electrical contact mechanism according to claim 1, wherein rotation axes of the first member and the second member are coaxially arranged with a rotating shaft of the supporting mechanism.

4. An electrical contact mechanism according to claim 1, wherein the first member is fixedly mounted to a member of the supporting mechanism, which supports the rear window, and the second member is fixedly mounted to the vehicle body, wherein the first contact is connected with the electrical apparatus mounted to the rear window, and the first contact is electrically connected with the second contact when the roof and the rear window are extended to fully cover the upper portion of the vehicle compartment.

5. An electrical contact mechanism according to claim 1, wherein the first member is fixedly mounted to a member of the supporting mechanism, which supports the rear window, and the second member is fixedly mounted to the vehicle body, wherein the first contact is connected with the electrical apparatus mounted to the rear window, and the first contact is electrically connected with the second contact when the roof and the rear window are extended to fully cover the upper portion of the vehicle compartment.

6. An electrical contact mechanism according to claim 4, wherein the electrical apparatus mounted to the rear window includes a defogger.

7. An electrical contact mechanism according to claim 5, wherein the electrical apparatus mounted to the roof includes an electrical lock.

8. An electrical contact mechanism according to claim 1, wherein electric power is supplied to electrical apparatuses mounted to the roof and the rear window by connecting the first contact with the second contact.

9. An electrical contact mechanism according to claim 4, wherein the electrical apparatuses mounted to the roof and the rear window are an electrical lock and a defogger, respectively.

* * * * *